C. R. LAUGHLIN, JR., ET AL 3,471,856

POSITION LOCATION AND DATA COLLECTION SYSTEM AND METHOD

Filed May 22, 1967

3,471,856
POSITION LOCATION AND DATA COLLECTION SYSTEM AND METHOD

Charles R. Laughlin, Jr., Silver Spring, Gay E. Hilton, Riverdale, Richard C. Lavigne, Silver Spring, and Roger C. Hollenbaugh, Greenbelt, Md., assignors to the United States of America as represented by the Administrator of the National Aeronautics and Space Administration
Filed May 22, 1967, Ser. No. 641,431
Int. Cl. G01s 9/00, 1/30, 9/56
U.S. Cl. 343—6                        27 Claims

ABSTRACT OF THE DISCLOSURE

A system for telemetering the position of a plurality of remote objects to a central station comprises a plurality of very low frequency transmitting stations for emitting isophase signals that are picked up by receivers on the objects. The very low frequency received signals are converted to VHF signals, that are relayed to the central station via a synchronous satellite. At the central station, the received signals are processed to derive indications of the remote object positions.

---

The invention described herein was made by employees of the United States Government and may be manufactured and used by or for the Government for governmental purposes without the payment of any royalties thereon or therefor.

The present invention relates generally to telemetering and more particularly to a system for and method of frequency converting VLF position indicating signals received on a remote object and relaying the converted signal to a central station.

The United States Navy has developed a world-wide position locating system, known as Omega, described in detail in a publication entitled "Omega, A World-Wide Navigational System," published for the Omega Implementation Committee by Pickard and Burns Electronics, 103 Fouth Ave., Waltham, Mass. In the Omega system, a plurality of very low frequency electromagnetic transmitters are located at differing points around the surface of the globe. The Omega transmitters derive a series of time division multiplexed tones, having frequencies in the band between 10.2 and 13.6 kHz. The very low frequency band was selected because complete global coverage by the VLF signals is attained by employing eight transmitting stations, each radiating 10 kilowatts of RF power.

The eight very low frequency Omega transmitters emit coherent waves, whereby the position of VLF receivers responding to two pairs of waves is determined by utilizing hyperbolic, isophase characteristics, similar to those employed with higher frequency, conventional Loran systems. Omega differs from Loran, however, because each transmission burst is considered as continuous wave, having a period on the order of one second, rather than a short duration pulse, having a period on the order of microseconds. Because transmission is on a continuous wave basis with the Omega system, position determination is made in response to the phase of the received signal, rather than pulse time of arrival.

The several transmitters of the Omega system are arranged so that at any particular instant of time, only one transmitter emits a particular frequency. During a second interval of time, the transmitted frequencies are shifted, whereby the frequency transmitted from a first station during the first interval is transmitted from a second station during the second interval. Signals of the same frequency are received on an object the position of which is being monitored during the first and second time intervals. The relative phase difference of the two identical frequency signals enables an indication of the locus of points where the monitored object lies, to be derived. The receiving object responds to the identical frequency from still a third station during a third time interval, whereby another isophase line can be generated in response to the phase difference between the third signal and one of the first two signals. Because the positions of the three stations are known, the position of the object can be ascertained from the intersection of the isophase lines.

Each Omega transmitter emits waves of differing frequencies at different times to enable the movable object position to be obtained without ambiguity. Presently, each Omega transmitter emits waves at three different frequencies, 10.2 kHz., 11.33 kHz. and 13.6 kHz. The 1.13 and 3.4 kHz. separations of the two higher frequency waves from the 10.2 kHz. emission enables the position of the object being monitored to be determined within a region having sides of 71.5 nautical miles. It is envisioned that the Omega system will be extended, whereby no ambiguity occurs within a region having sides of approximately 7,140 nautical miles by reducing the frequency separation between the 10.2 kHz. emitted wave and another wave to 11.33 hertz. Since, however, only three frequencies are currently being emitted from each Omega transmitter, the system described herein has ambiguity limited to regions with sides of 71.5 nautical miles.

Prior to the present invention, the Omega system was utilized solely as a system for and method of determining the position of naval vessels. The vessels are equipped with considerable electronic data processing devices that respond to the transmitted very low frequency Omega signals and derive accurate indications of their position. It develops, however, that it is desirable to determine the position of many objects that cannot carry the relatively complex, expensive and power consuming data processing devices required to determine position from Omega emissions.

According to the present invention, the need for relatively complex, power consuming and expensive data processing equipment on the objects whose position is being monitored is obviated by equipping each object with a transponder. The transponder on each object, on command, responds to the VLF Omega signals and converts these signals to a very high frequency that is relayed on a real time basis, to a central, ground station via a VHF link including a synchronous satellite. Each transponder is normally in a relatively inactive state, drawing a relatively low amount of energy from a power source contained thereon. The transponder is activated to an energized condition only in response to receiving an interrogation signal from the central station via the satellite. Only upon interrogation of the transponder and after certain control and data signals have been transmitted to the central station via the satellite, are the power supplies for the transponder channels responsive to the Omega signal activated. Thereby, the power requirements of the transponder are minimized, an essential feature for one of the prime uses of the transponders, namely in conjunction with meteorological monitoring balloons. Such balloons generally are equipped with minimum power supplies or, possibly, a small bank of solar cells for battery charging.

In transmitting data between the transponders on the movable objects and the central station via the satellite, minimization of bandwidth is essential. In the present instance, reducing bandwidth to the greatest possible extent is necessary because the VHF transmission medium between the transponder, the satellite and the central station introduces perturbations on signals of different frequencies. Because data indications are represented as phase shifts imposed on the Omega signals that modulate the VHF carrier between the transponder and the satellite, the requirement for bandwidth reduction in the present instance is even more important than in the usual satellite communications system. In other words, it is essential that the several different frequencies transmitted between the transponder and the ground station via the satellite be phase shifted precisely to the same degree, which can occur only if the transmitted VHF frequencies are substantially the same.

It has been found that separations as small as 3.4 kHz. on a 150 mHz. carrier can be differentially modified to such an extent that the derivation of accurate phase information at the central station is impossible. Hence, the 3.4 kHz. separation of the Omega signals is reduced to a 1.9 kHz. separation, to minimize the effect of VHF perturbation and preserve satellite transmission bandwidth.

Because positional information is transmitted to the centrally located ground station as a phase shifted carrier and the VHF link is of variable length, the central station must include means for establishing a phase reference in synchronism with the phase of a reference signal derived by the transponder. In the system of the present invention, the phase reference is established at the central station with a phase locked loop that is established in response to a coherent signal transmitted from each transponder during an initial portion of its transmitting sequence. During the interval when the transponder is relaying additional data concerning its position, the central station phase locked loop is maintained by transmitting the reference at a reduced amplitude.

A further feature of the present invention relates to simultaneously deriving information from a plurality of transponders and to the manner by which data from the several transponders are separated at the central station. In particular, each transponder has a separate VHF carrier that is fed on a frequency multiplexing basis to a plurality of parallel channels within the central station. Each of the channels is responsive to the VHF signal from one of the transponders and feeds signals to a position determining computer. Thereby, the phase modulated, position indicating signals derived from each transponder are fed to separate data processing channels in the central station to provide D.C. positional indicating signals that are fed to a data processor that derives signals representing each transponder location.

It is realized that the present invention is not the first system for or method of monitoring the position of remote objects via satellite communications to a central station. In particular, systems have been devised for monitoring the position of meteorological data collecting balloons utilizing low orbiting earth satellites. One low orbiting earth satellite system, however, must include data processing equipment to store instructions from a ground station until a predetermined elapsed orbital time, when the satellite is in communication range with the balloon. The balloon transponders are interrogated twice by the equipment in the earth satellite to determine the transponder position. In response to the pair of interrogations, positional indications of the balloon position are made and stored in a memory of the satellite.

The low orbiting satellite memory is interrogated for the data collected from the balloons by a central station during the time interval when the sataellite is passing over the station. The central station computes the position of the balloon and at an appropriate time relays data back to the memory of the satellite, commanding the equipment on the satellite to interrogate the balloon at predetermined times during a later orbit. Because satellites do not orbit over the same portion of the earth consecutively, however, there is a relatively large time gap between successive interrogations of the same balloon.

It is thus seen that the low orbiting satellite approach to the problem requires considerably more equipment on the satellite than the system and method of the present invention and that the number of balloons or transponders which can be interrogated is limited by the satellite memory. In addition, real time coverage of the balloons located at the different positions around the globe is not possible, precluding continuous monitoring of a particular balloon, as may be required.

The present invention obviates these problems by employing synchronous satellites for transmission between the transponders and the central station. Three synchronous satellites are sufficient to provide entire global coverage on a real time basis, while minimizing the amount of equipment required at the balloon site, and in the satellite. In essence, the equipment on the synchronous satellite employed with the present invention merely functions as a frequency shifting relay station.

It is, accordingly, an object of the present invention to provide a new and improved method of and system for telemetering data indicative of the position of remote objects to a central station.

Another object of the present invention is to provide a system for and method of determining the position of a plurality of objects which transpond very low frequency signals to a central station.

Another object of the present invention is to provide a system for and method of simultaneously determining the position of a plurality of objects which transpond very low frequency signals to a central station.

Still another object of the present invention is to provide a system for and method of coupling phase modulated, position indicating signals from movable objects to a central station via a synchronous satellite.

Yet another object of the present invention is to provide a transponder responsive to very low frequency signals for selectively converting said signals to VHF signals.

Still another object of the present invention is to provide a transponder that is normally maintained in a relatively inactive, low powered state, and is selectively energized to full power in response to an interrogation signal.

An additional object of the present invention is to provide a transponder for selectively transmitting a phase reference signal to a central station, followed by variable phase data indicating signals.

A further object of the present invention is to provide a central station for selectively interrogating one of a plurality of transponders in a group of transponders.

An additional object of the present invention is to provide a central station for receiving phase modulated, position indicating signals from a plurality of variable position transponders and for processing the received signals to provide position indications of the several transponders.

Yet another object of the present invention is to provide a new and improved system for and method of communicating between a plurality of remote stations and a central station via a satellite, wherein the satellite functions solely as a relay station.

Still another object of the present invention is to provide a method of and system for relaying the position of a plurality of remote objects to a central station on a real time basis via a satellite communication link that is always in line of sight between each of the objects and the central station.

The above and still further objects, features and advantages of the present invention will become apparent upon consideration of the following detailed description of one specific embodiment thereof, especially when taken in conjunction with the accompanying drawings, wherein.

Figure 1:
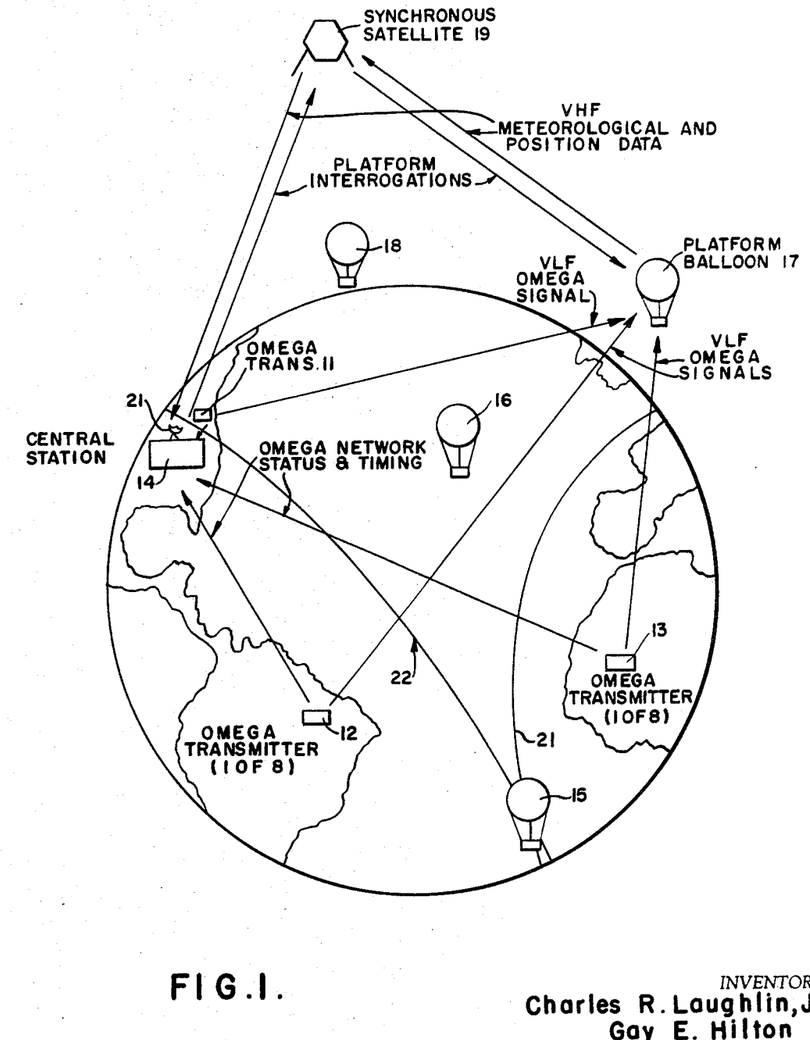
FIGURE 1 is a schematic diagram illustrating the principles of the present invention.

Reference is now made to FIGURE 1 of the drawings to provide a broad description of the system and operating method of the present invention. In FIGURE 1, three, approximately 10 kilowatt very low frequency Omega transmitters 11, 12 and 13, are illustrated as being positioned at fixed sites on differing portions of the global land mass. The very low frequency electromagnetic waves derived from transmitters 11–13 propagate about the earth, as a guided wave, in the region between the surface of the earth and the ionosphere. The VLF waves emitted by transmitters 11–13 have a very low attenuation rate and exhibit exceptional phase stability. These characteristics permit world-wide propagation of radio waves from transmitters 11–13 with phase stability maintained to an RMS variation of less than 5 microseconds for distances of at least 5,000 miles, whereby isophase lines subsist over a large global area, as illustrated by FIGURE 1.

The VLF waves emitted by transmitters 11–13 are received by a central, control station 14, as well as by a plurality of movable platforms, illustrated specifically as balloons 15–18. Balloons 15–18 include transponders for receiving the VLF emissions from transmitters 11–13, and converting them to a VHF signal that is transmitted to central station 14 via synchronous satellite 19. Synchronous satellite 19 is positioned approximately 22,000 miles above the earth, whereby the satellite and earth rotate at the same angular velocity about the global poles and the satellite appears to be fixed at a predetermined point above the earth. Satellite 19, in line of sight VHF radio communication with balloons 15–18 and control center 14, converts the frequency of the VHF signals emitted by the balloons to a second frequency in the VHF spectrum, that is received by antenna structure 21 at the control center 14.

Each of balloons 15–18, in addition to including transponding apparatus for converting the VLF signals from Omega transmitters 11–13 to VHF signals, includes a plurality of meteorological sensors, e.g., temperature and pressure transducers. Signals from the meteorological sensors are converted to phase modulated data indicating signals that are relayed to control center 14 via the VHF link subsisting through synchronous satellite 19.

Control center 14, as well as receiving meteorological and position indicating data from the VHF transmitters of balloons 15–18, includes means for selectively interrogating all the balloons, with each one being interrogated at a different time on a time division multiplexing basis. To this end, a VHF link exists from a transmitter at central station 14 via satellite 19 to each of the balloons 15–17 in the field of view of the satellite. The circuitry on each of the balloons is relatively inactive, except for approximately a three minute interval subsequent to a particular balloon being interrogated with a control signal from central station 14.

Central station 14 includes means for receiving the VLF emissions of Omega transmitters 11–13. Emissions from transmitters 11–13 are sequenced in such a manner as to enable the equipment at central station 14 to determine which transmitter is emitting waves of a particular frequency, at any instant of time. Central station 14 responds to the VLF emissions of transmitters 11–13, whereby a computer included therein is controlled to provide information indicative of the Omega transmitters a particular balloon transponder responds to at any instant of time.

VHF transmission to satellite 19 is always approximately at the same carrier frequency, regardless of its origin. Similarly, transmission from the satellite is at approximately the same carrier frequency, whether it is directed toward central station 14 or balloons 15–18. Satellite 19 responds to the spectrum transmitted to it by station 14 or balloons 15–18 and converts it to a different frequency for relaying back to earth. In particular, radiation reaching satellite 19 is centered at a frequency of approximately 148 mHz. and emission therefrom is centered at a frequency of approximately 137 mHz.

To simplify the present disclosure, only three Omega transmitters 11–13 and four transducer carrying balloons 15–18 are illustrated. In addition, only a single synchronous satellite 19 is specifically shown in FIGURE 1. It is to be understood, however, that in a world-wide system, eight different Omega transmitters and three synchronous satellites are employed. In addition, several thousand transducer carrying balloons may be provided. Further, objects other than meteorological balloons may include transducers, in accordance with the invention. For example, transducers can be mounted on mobile land and sea creatures to determine their migratory patterns, or on aircraft or ships to determine their location at a central station. In a world-wide system, each synchronous satellite communicates with a separate land based relay station, connected via a land line to a central control center.

To conform the present description with the present Omega transmission system, while maintaining the exposition in a readily understood manner, the system is presumed to include eight VLF Omega transmitters A–H, four platforms or balloons 15–18, each including a transponder, a single synchronous satellite 19, and a single central control station 14, that need not communicate with other ground based stations to determine the positions of balloons 15–18. Occasionally, Omega stations A, B and C are referred to as stations 11, 12 and 13, respectively.

The eight Omega transmitters emit very low frequency electromagnetic waves of frequencies 10.2 kHz., 11.33 kHz. and 13.6 kHz. The VLF signals emitted from the eight Omega transmitters provide indications of the locations of balloons 15–18 because of the known finite transmission velocity between each of the stations and the balloon receiving the signals. Each balloon responds to the same frequency from a pair of Omega transmitters at different time intervals. The same Omega frequency from the two transmitters arrives with different phases at the balloons, to establish isophase hyperbolas for position determination. For example, the 10.2 kHz. signals from transmitters 12 and 13 arrive at balloon 15 with differences in their relative phases of $\varphi_1$. In response to the $\varphi_1$ phase separation between the VLF signals arriving at balloon 15 from transmitters 12 and 13, hyperbolic isophase line 21 is established. A second hyperbolic isophase line 22 is formed in response to an assumed $\varphi_2$ phase difference between the 10.2 kHz. signals propagating to the balloon location from Omega transmitters 11 and 13. The intersection point of hyperbolas 21 and 22, in response to the assumed relative phase differences of the signals from the two pairs of Omega transmitters, determines the position of balloon 15.

Isophase lines 21 and 22, unfortunately, are ambiguous. Ambiguity results because the relative phase difference patterns reoccur for each successive half wave length of the VLF transmission at a particular frequency from each of the Omega transmitters. In particular, a 10.2 kHz. electromagnetic wave has a half wave length of approximately eight miles, whereby for every eight mile interval between transmitters 12 and 13, a repetitive pattern of relative phase shift of the signals emitted by the transmitters occurs. To avoid the problem of ambiguity, each Omega transmitter sequentially emits a different frequency to establish wider areas between adjacent reoccurring regions of repetitive phase difference patterns. To this end, each of the Omega transmitters emits the three different frequencies mentioned supra. The 13.6 kHz. and 11.33 kHz. waves derived from the Omega transmitters are separated from the basic 10.2 kHz. emission by 3.4 kHz. and 1.13 kHz. to establish half wave length distances of 23.8 and 71.5 miles, respectively. Thereby, the problem of ambiguity is eliminated to a large extent because the approximate position of the balloons 15–18 is generally known, at least to within 70 miles. The Omega system, as it is planned to be finally developed, however, envisages the transmission of three additional frequencies from each of the transmitters. The additional frequencies are separated from the 13.6, 11.33 and 10.2 kHz. wave by 226.66 Hz., 45.33 Hz. and 11.33 Hz. to establish half wave length separations of 363, 1786 and 7143 nautical miles, respectively. Hence, the finalized Omega system will require zero a priori knowledge concerning the locations of the balloons in this system to determine their position at any time instant. Since, however, the Omega system has not added the three latter frequencies and the system is operable based on the three existing frequencies, further consideration will be given only to emissions from the Omega transmitters at 10.2 kHz., 13.6 kHz. and 11.33 kHz.

Figure 2:
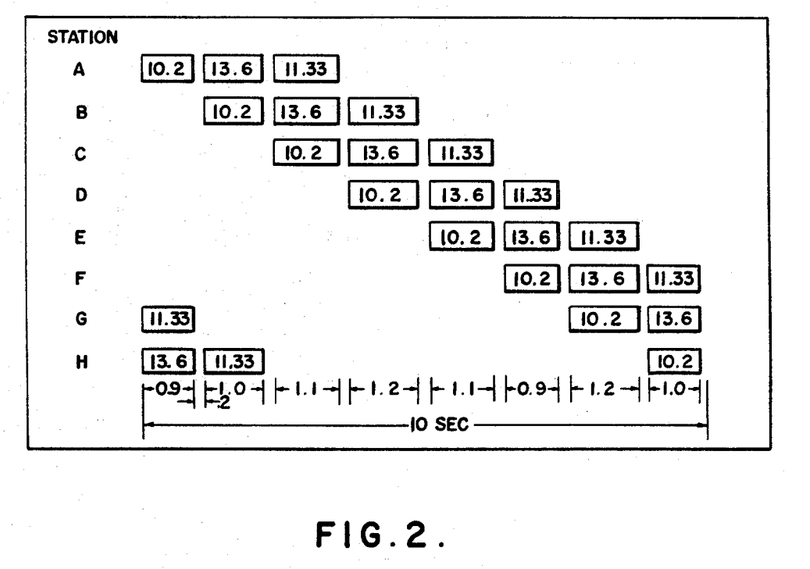
FIGURE 2 is a chart of the transmitting sequence and frequencies of the Omega system, as presently employed.

The three frequencies are transmitted from the eight Omega stations A–H in accordance with the timing chart of FIGURE 2. From FIGURE 2, it is noted that a complete cycle of time division multiplex emissions from the several Omega transmitters occurs within a period of 10 seconds. The 10-second interval is divided into eight operating sequences, each approximately 1 second in duration and separated from each other by 0.2 second. During the first five seconds of each 10-second period, the several Omega transmitters are activated for differing time periods. In the second half of each 10-second interval, the four activation times are also different from each other. Each of the four different periods during the second five second period is, however, identical to one of the operating periods during the first half of the 10-second interval. During the second half of each 10-second interval, the sequence of activation time is different from the first half sequence, whereby identification of which Omega transmitter is emitting energy at any particular time can be accomplished. Considering the first activation time of 0.9 second of each 10-second sequence, stations A, G and H derive electromagnetic energy at frequencies 10.2 kHz., 11.33 kHz. and 13.6 kHz. During the next activation time, between 1.1 and 2.1 seconds of the operation sequence, stations A, B and H emit energy at frequencies of 13.6 kHz., 10.2 kHz. and 11.33 kHz., respectively.

As indicated supra, the transponders on each of balloons 15–18 respond to the time sequenced signals from the eight Omega transmitters and relay these signals as VHF waves, in unmodified form (except for frequency conversion), to central station 14 via synchronous satellite 19. No computations are performed on balloons 15–18 and emissions therefrom are solely via single side band communication links, to minimize power requirements.

Figure 3:
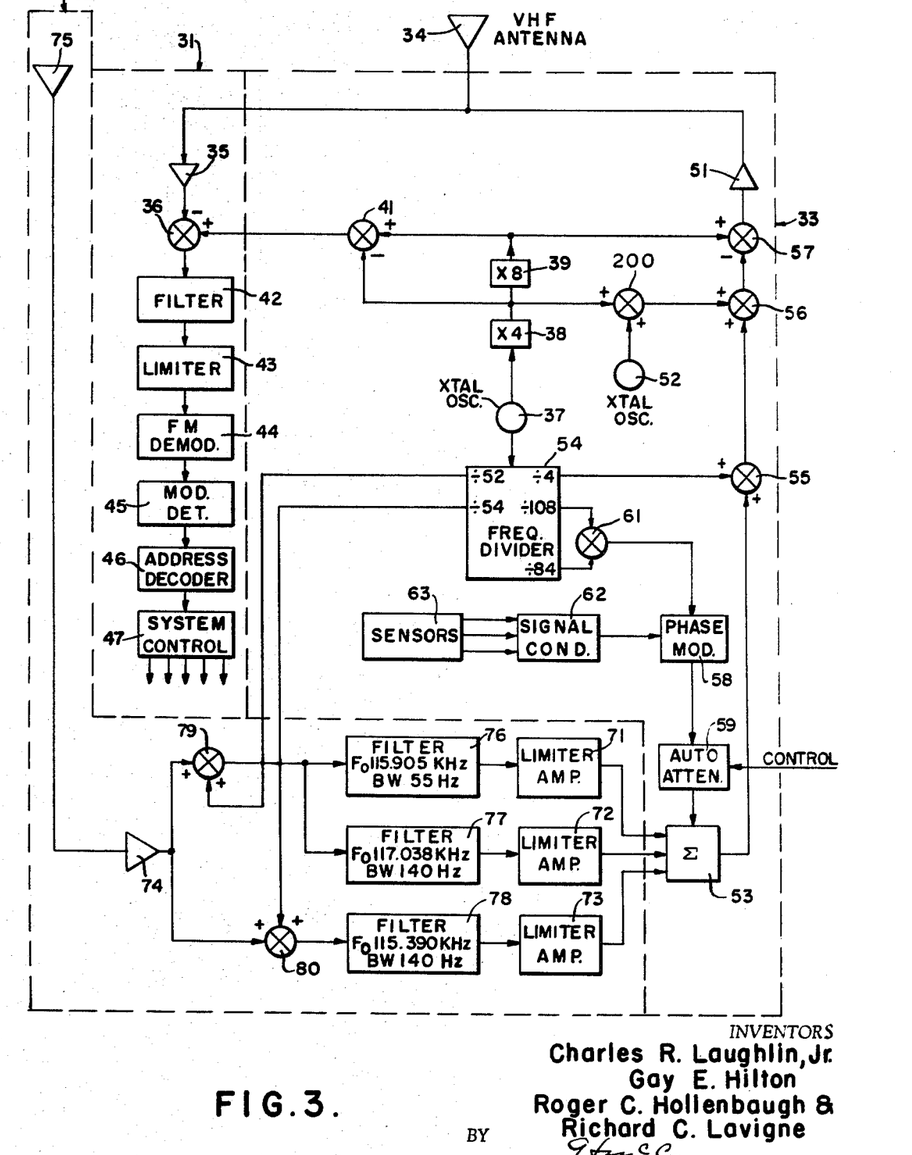
FIGURE 3 is a block diagram of the transponder contained on each of the balloons illustrated by FIGURE 1.

Reference is now made to the circuit diagram of FIGURE 3 for a description of the transponder contained on one of the balloons 15–18, specifically balloon 15. The transponder includes an interrogation or command responsive VHF channel 31, a very low frequency receiving channel 32 and a VHF transmission channel 33, which also includes frequency converting apparatus. VHF command channel 31 and VHF transmission channel 33 share VHF antenna 34 on a time division multiplex basis.

Broadly, command and interrogating channel 31 includes means for recognizing coded signals emitted from central station 14 and transmitted to balloon 15 via synchronous satellite 19. The command signals are frequency modulated, utilizing conventional frequency shift keying techniques, and are transmitted to each of the balloons in the line of sight path through satellite 19 via a carrier at 135.6 mHz. The 135.6 mHz. carrier is deviated by ±2400 Hz. to represent binary zeros and ones, indicative of the particular balloon transponder being interrogated. Once a particular balloon transponder receives an interrogation signal indicating that it is to be coupled via the VHF link to central station 14, it initiates a plurality of time sequenced controls.

To these ends, channel 31 includes tuned RF amplifier 35, having a center frequency of 135.6 mHz. and adequate band pass to prevent attenuation of the ±2400 Hz. FSK signal. The RF output of amplifier 35 is continuously heterodyned with a 153.906 mHz. signal in mixer 36, to derive a beat frequency of 18.3065 mHz. The 153.906 mHz. input to mixer 36 is derived from free running, temperature compensated crystal oscillator 37, that derives a stabilized output frequency of 5.49660 mHz. The output of oscillator 37 is multiplied in frequency by a factor of four in frequency multiplier 38, and is multiplied by a further factor of eight in frequency multiplier 39. The outputs of frequency multipliers 38 and 39 are heterodyned together in mixer 41, the beat frequency output of which is the 153.906 mHz. standard applied to mixer 36.

The lower side band output of mixer 36 is applied to IF filter 42, which feeds cascaded limiter 43 and FM, discriminator type, demodulator 44. Broadly, modulation detector 45 and address decoder 46 respond to a so-called Manchester non-return to zero code that frequency modulates the carrier (FSK) transmitted from central station 14. In a Manchester code, binary zero and one bits are represented by negative and positive going transitions in the center of each bit, whereby, e.g., the binary bit sequences 00 and 01 are represented respectively by signal levels of $+-+-$ and $+--+$. At central station 14, initially a series of alternate binary zeros and ones is transmitted as the ±2400 Hz. modulation. Thereafter, the coded addresses of all the balloons to be interrogated are transmitted from station 14 in sequence as ±2400 Hz. modulation of the transmitted carrier. Of course, none of the balloon coded addresses is a series of sequential zeros and ones; in each case there are at least two adjacent like valued bits.

Modulation detector 45 at each of the balloons 15–18 responds to the initial sequence of alternate binary zeros and ones, as derived from demodulator 44, to activate the power supply of address decoder 46. Decoder 46 does not respond to constant amplitude outputs of detector 45, as occur in response to C.W. emissions from station 14 at a single frequency, because the decoder and detector are AC coupled. Detector 45 includes conventional diode detector circuitry for deriving at least a predetermined D.C. output voltage in response to the alternate positive and negative voltages being derived from demodulator 44 for a set time period, less than the period during which the initial sequence of zeros and ones is generated. Detector 45 continues to derive the predetermined D.C. voltage as long as Manchester code FSK zeros and ones are being transmitted from central station 14. In response to the predetermined D.C. output voltage of detector 45, address decoder 46 on each balloon 15–18 is connected to a power supply and is prepared to recognize its address. All of the address decoders remain connected to their power supplies until the output voltage of detector 45 drops below the predetermined level, i.e., after transmission of the Manchester code FSK signals from station 14 has ceased.

Address decoder 46 includes a shift register, having a number of stages equal to the number of address bits in the interrogating signal derived from central station 14. In the hypothetical system being considered, wherein four balloons are included, it is necessary only to provide a three-stage shift register, since the four different balloon addresses can be uniquely identified with a three-bit binary word, while providing the initial sequence. It may also be desirable to include a parity bit, in the event of a high noise level in the VHF transmission link between the central station and the balloons, whereby a balloon will not be erroneously interrogated. Each stage of the shift register included within address decoder 46 is connected to a coincidence gate, the other input of which is responsive to a voltage source having a predetermined magnitude corresponding with the binary level for the particular bit position of the balloon address. The several coincidence gates drive a flip-flop that is activated in response to address decoder 46 receiving a series of bits corresponding with the bits of its predetermined address code. Activation of the flip-flop decouples the decoder register from the binary bits generated by demodulator 44, whereby the flip-flop remains in the activated state regardless of further reception of FSK data by the balloon transponder under consideration.

The decoder 46 flip-flop output is connected to an input of inhibit gate, the other inhibit input being responsive to the output of modulation detector 45. Thereby, the output of the activated flip-flop is passed through the inhibit gate only after reception of the FSK signal has terminated. The output of the activated flip-flop passed through the inhibit gate forms a control signal for activating system control network 47. Thereby, the system control network 47 of each balloon interrogated by central station 14 is simultaneously activated. System control network 47 includes a clock mechanism to selectively activate different portions of the apparatus included in the transponder.

Prior to actuation of system control network 47 in response to the output of address decoder 46, the only circuitry supplied with power in the transponder is free-running temperature compensated oscillator 37, amplifier 35 and address decoder 46. The remaining VHF interrogation signal processing devices are passive in nature, such as varactor frequency multipliers, crystal mixing diodes and crystal diode demodulators. It is noted that power is not supplied to address decoder 46 until the 300 millisecond modulation is detected by a passive integrating network included in modulation detector 45. Thereby, the standby power requirements of the transponders of the present invention are maintained at an extremely low level. For the first half second after system control network 47 is actuated by address decoder 46, the active elements in the VHF transmitter portion of the transponder are energized, namely bandpass amplifier 51 and temperature compensated, crystal oscillator 52.

The output of oscillator 52 is combined with reference frequencies derived from oscillator 37 in mixer 200 to derive a single side band wave having a center frequency that is different for each of the balloons in the array. To this end, each of the oscillators 52 has a different frequency, expressed by $3,19619 + (N+\frac{1}{2})2.5 \times 10^{-3}$ mHz. In this expression, N is an integer indicative of the separation frequencies between the adjacent frequencies emitted from the transponders of the several balloons. In the system of FIGURE 1, the oscillators 52 of the several balloons are assigned frequencies in accordance with:

TABLE I

| | N | f(mHz.) of L.O. 52 | f(mHz.) Trans. |
|---|---|---|---|
| Osc. 52 in Balloon: | | | |
| 15 | 1 | 3.20044 | 149.224 |
| 16 | 2 | 3.20290 | 149.226 |
| 17 | −1 | 3.18294 | 149.216 |
| 18 | −2 | 3.18044 | 149.214 |

A spectrum having a center frequency of 116.214 kHz. and a 3 db bandwidth of approximately 1.9 kHz. is generated by summing amplifier 53 and frequency shifted by reference waves derived from frequency divider 54, mixers 55, 56 and 57, frequency divider 39, mixer 200, and crystal oscillator 52. Thereby, mixer 57 derives a single side band having a center frequency of $149.2 + (N+\frac{1}{2})2.5 \times 10^{-3}$ mHz., which is applied to the input of RF bandpass amplifier 51. Bandpass amplifier 51 has a center frequency coincident with the center frequency of the spectrum applied to it by mixer 57 and sufficient bandpass to cover the entire 1.9 kHz. spectrum derived from summing amplifier 53.

While the apparatus necessary to establish the $149.22 + (N+\frac{1}{2})2.5 \times 10^{-3}$ mHz. output of amplifier 51 is being supplied with power, system control network 47 activates phase modulator 58 and applies a control voltage to automatic attenuator 59. Phase modulator 58 responds to plus and minus binary input voltages to selectively shift the phase of the signal generated by mixer 61 by an amount ±60° for a purpose seen infra; for zero input voltages, modulator 58 passes the mixer output in unmodified form. Attenuator 59 selectively reduces the signal level applied to it by a factor of 10 db in response to a preselected signal from controller 47.

During the interval from 0.5 to 11.883 seconds after initial activation of system control network 47 (t=0.5 to t=11.883 seconds), automatic attenuator 59 is energized so that it passes the output of phase modulator 58 with full power to summing amplifier 53. The signal applied by attenuator 59 to summing amplifier 53 is a reference, single side band tone having a frequency of 116.331 kHz., derived by mixer 61 in response to 50.895 kHz. and 65.4364 kHz. outputs of frequency divider 54, energized by temperature compensated crystal oscillator 37. The reference tone applied by attenuator 59 to summing amplifier 53 during approximately the first twelve seconds of the transponder operation, is converted in frequency to a single side band VHF signal. The VHF acquisition reference signal, referred to as an A/R tone, is transmitted to central station 14, via the VHF satellite communication link, to establish a phase locked loop at the central station. The phase locked loop established at the central station identifies the particular transponder that has responded to the central station interrogation.

After the A/R tone has been transmitted for approximately 11.33 seconds, system control network 47 is advanced to another step. At the next step, signal conditioner 62 is energized to selectively couple meteorological signals detected by sensors 63 to phase modulator 58. Sensors 63 can be either of the analog or digital type; if the sensors are of the analog type, signal conditioner 62 is an analog-to-serial digital converter; if the sensors are of the digital type, the signal conditioner is a parallel-to-serial converter. The bits of the binary words derived from signal conditioner 62 are applied in time squence to phase modulator 58 to pass the output of mixer 61 to summing amplifier 53 with a ±60° phase shift, depending upon the value of the binary bit at the particular instant being considered. For example, if the binary bit value is one, as indicated by a positive voltage, the output of mixer 61 is applied to summing amplifier 53 with a phase of +60°, while a binary zero output of signal conditioner 62, a negative voltage level, causes phase modulator 58 to shift the mixer output by −60°. Thereby, summing amplifier 53 derives a series of phase modulated sinusoids representing binary data derived from sensors 63. Like the reference tone derived from mixer 61 during the 0.5 to 11.83 second period, the binary indicating, phase shifted sinusoidal tones at 116.331 kHz. are transmitted via a single side band link from antenna 34 to station 14.

Approximately 3.94 seconds are required to transmit the data detected by sensors 63. Upon the completion of sensor data transmission, at an elapsed time of 15.78 seconds after activation of system controller 47, the transponder very low frequency receiving channel 32 is activated while a control signal is applied to automatic attenuator 59. The control signal applied to automatic attenuator 59 reduces the level of the 116.331 kHz. reference frequency applied by the attenuator to summing amplifier 53, whereby the transmitted A/R tone power drops from approximately 5 watts to approximately 0.5 watt, i.e., a 10 db reduction in the transmitted reference A/R tone occurs. Transmission of the A/R tone is tolerable at a lower level because the receiver phase locked loop has been established and can now be maintained with a relatively low amplitude input signal. Continuous transmission of the A/R tone is required, however, to maintain the central station 14 phase locked loop stabilized.

While attenuator 59 feeds the reduced amplitude A/R reference tone to amplifier 53, very low frequency Omega signal channel 32 is energized by applying power to limiter amplifiers 71-73 and VLF amplifier 74. VLF amplifier 74 is responsive to the signals transduced by VLF antenna 75 to feed, via mixers 79 and 80, bandpass filters 76-78. Mixers 79 and 80 respond to Omega signals at the output of VLF amplifier 74 and the 100.570 kHz. and 101.790 kHz. signals derived from frequency divider 54 to translate the Omega signals at frequencies 10.2 kHz., 11.33 kHz. and 13.6 kHz. to upper side band frequencies of 115.905 kHz., 117.038 kHz. and 115.390 kHz., respectively. Filters 76-78 have center frequencies of 115.905 kHz., 117.038 kHz. and 115.390 kHz., respectively, and each has a sufficiently high Q to reject all of the frequency converted Omega signals, except the one at its particular center frequency. The single side band, frequency converted Omga signals passed through filters 76-78 are applied, via limiting amplifiers 71-73 to summing amplifier 53. In converting the very low frequency signals to approximately 116 kHz. signals, the band width of the Omega spectrum is reduced from approximately 3.4 kHz. to approximately 1.648 kHz. Within the 1.648 kHz. spectrum of the three Omega frequencies lies the reference A/R tone, as indicated by the spectral diagram of FIGURE 4.

Figure 4:
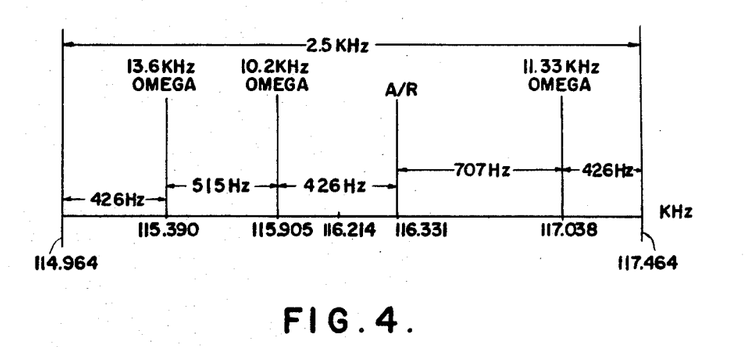
FIGURE 4 is a spectral diagram of the spectrum transmitted from the transponder of FIGURE 3.

From FIGURE 4, it is seen that the 13.6 kHz. Omega tone is translated to a frequency of 115.390 kHz. and the 11.33 kHz. tone is translated to a frequency of 117.038 kHz. Between the 13.6 kHz. and 11.33 kHz. Omega tones lie the 10.2 kHz. Omega tone and the reference, A/R tone at frequencies of 115.905 and 116.331 kHz., respectively. To enable complete transmission and reception of all of the tones within the spectrum being considered, the spectrum is passed through circuits having band-widths of 1.9 kHz. and is considered as being enlarged to 1.9 kHz. so that it extends from 115.163 kHz. to 117.084 kHz., i.e., the bandwidth of filters in control station 14 and the network cascaded from the input of amplifier 53 to the output of amplifier 51 have 3 db points to pass the 1.9 kHz. spectrum specified by FIGURE 4.

It is noted that less than 150 Hz. exists between the 3 db points of the transmitted spectrum and the spectral lines of the 13.6 kHz. and 11.33 kHz. Omega tones. The proximity between the information tones and the transmitter and receiver cut-off points is tolerated because the positional information signals are modulated to produce no substantial sidebands. Instead, the transponder merely relays the virtually continuous wave, coherent signals received from the Omega stations to central station 14 via the VHF link including synchronous satellite 19 by frequency translation techniques. Since the positional information is determined by time of arrival of CW signals at the transponder, relative to transmission occurrence times from the Omega stations, there is no need for wide bandwith communication links.

While the Omega signals are being coupled through the transponder, it is likely that an extremely strong VLF signal will be received by antenna 75. In such an event, a very large amplitude output is derived from one of filters 76-78. This large amplitude signal, if unaltered, would require substantially all of the available transponder VHF transmitter power and prevent substantial transmission of the reduced amplitude A/R reference tone. To avoid this possibility, limiter amplifiers 71-73 are connected between bandpass filters 76-78 and the inputs of summing amplifier 53, whereby not more than 4.5 watts can be radiated at any time in response to the position indicating, Omega responsive signals.

The VLF Omega signals transduced by antenna 75 are transmitted by antenna 34, on a real time basis, after being translated to the VHF frequency spectrum by mixers 55, 56 and 57. Transmission of the VLF signal replicas via the VHF link occurs for a time interval of 181 seconds, from $t=16.2$ seconds to $t=197.2$ seconds, after completion of interrogation. Thereby, 18 complete sequences of the Omega signals are transmitted between balloon 15 and central station 14 via synchronous satellite 19 each time that the transponder on balloon 15 is activated by an interrogation signal from the central station. Transmitting 18 Omega samples received on balloon 15 enables central station 14 to determine the velocity of the balloon, in addition to eliminating errors that might be introduced by the VHF link. The equipment at the central station 14 statistically computes the position and velocity of balloon 15 in response to the received data, whereby errors due to noise and possible phase perturbations in the link are effectively canceled.

Figure 5:
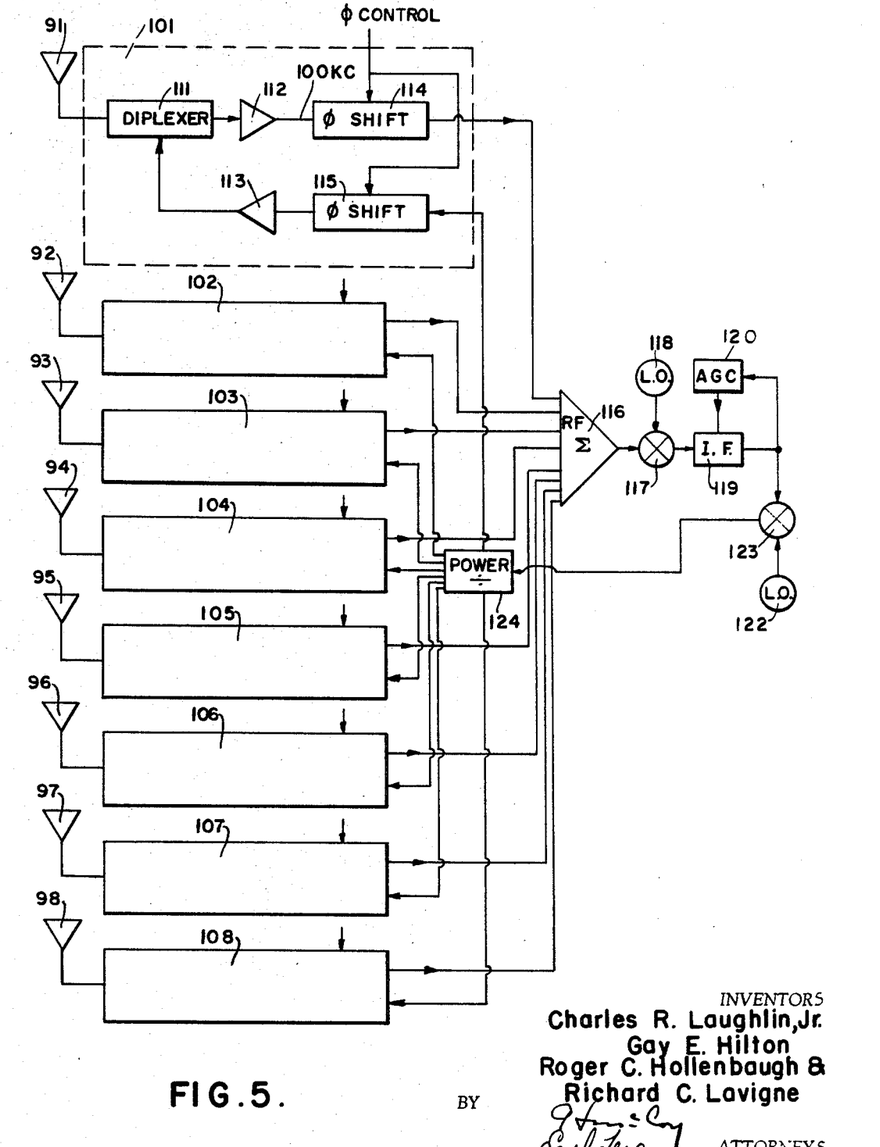
FIGURE 5 is a block diagram of the satellite circuitry.

Reference is now made to FIGURE 5 of the drawings, wherein there is illustrated a block diagram of the apparatus preferably employed on synchronous satellite 19. Basically, the circuitry contained on satellite 19 includes means for converting the VHF signals in the link between the satellite and central station 14 to a second VHF spectrum that is coupled to balloons 15-18. In addition, the satellite includes circuitry for compensating the phase shift effects introduced by rotation imparted to the satellite for position stabilization.

In particular, the satellite relay station includes an array of eight antennae 91-98, each of which separately feeds one of eight control networks for compensating the effects of satellite rotation. Since each of the eight control networks 101-108 is identical, a description of only network 101 is given. Control network 101 comprises diplexer 111, connecting antenna 91 to the input of tuned RF amplifier 112 and to the output of RF amplifier 113. Transmission to antenna 91 is always in a frequency spectrum centered approximately about 148 mHz. while emissions from the antenna are centered about a frequency of 137 mHz. Hence, the center frequencies of RF amplifiers 112 and 113 are selected as 148 mHz. and 137 mHz., respectively. Amplifiers 112 and 113 have adequate bandpass to enable the entire spectrum transmitted between central station 14 and balloons 15-18 to be passed. In an actual system, wherein 40 balloons can be interrogated at any time, the bandpasses of amplifiers 112 and 113 are 100 kHz.

To compensate for the rotational effects of satellite 19. the output of amplifier 112 and the input to amplifier 113 are varied in phase by phase shifters 114 and 115, respectively. Phase shifters 114 and 115, in each of the control channels 101-108, have D.C. voltages applied thereto such that the phases of signals transduced by the array of antennae 91-98 are not affected by the constant rotation of satellite 19.

The voltage generated by each of the phase shifters 114 in control networks 101-108 is applied to RF summing amplifier 116, the output of which is applied to mixer 117. Mixer 117 is also responsive to a reference frequency at 118.5 mHz., generated by local oscillator 118. Mixer 117 responds to its two inputs to derive a difference frequency spectrum centered about 29.5 mHz., which spectrum is applied to IF amplifier 119, having variable gain controlled by AGC network 120. The IF spectrum derived from amplifier 119 is heterodyned with the 116.5 mHz. reference frequency generated by local oscillator 122 in mixer 123. Mixer 123 responds to the spectrum applied thereto and the reference frequency of local oscillator 122 to derive a difference frequency centered about 137 mHz.

The 137 mHz. output of mixer 123 is applied to power divider 124, having eight parallel outputs that are applied to the inputs of control networks 101-108. Control networks 101-108 selectively phase shift the 137 mHz. signals applied thereto to compensate for the constant rotation of satellite 19 about its own axis. Satellite 19 receives signal spectrums centered about 148 mHz. from center station 14 and balloons 15–18, phase shifts these signals to compensate for satellite spin, changes the frequencies of the signals to a spectrum centered about 137 mHz., again compensates for satellite spin effects, and transmits the lower frequency VHF signal to the central station and balloons.

Figure 6:
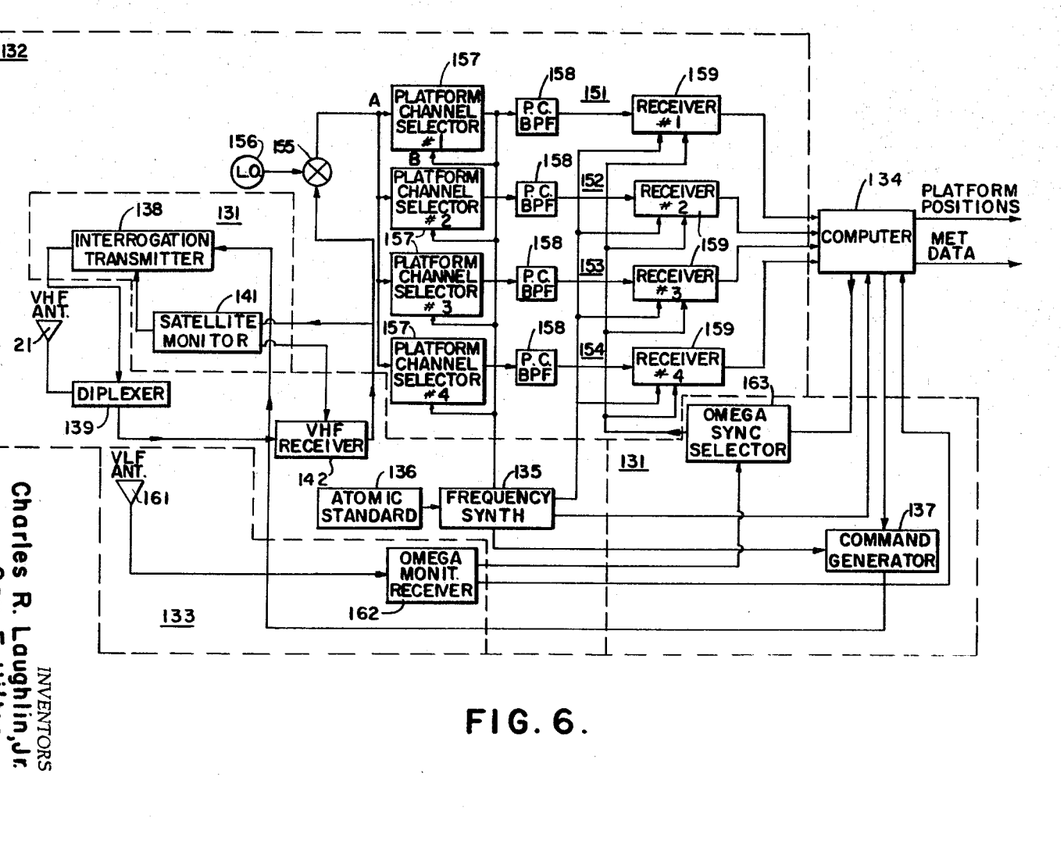
FIGURE 6 is a block diagram of the central station equipment.

Reference is now made to FIGURE 6 of the drawings wherein a block diagram of the circuitry included at central station 14 is illustrated. Central station 14 is divided essentially into three segments, namely: control channel 131; VHF receiving channel 132; and VLF receiving channel 133. All three sections are responsive to or controlled by signals derived from computer 134, which is preferably a general purpose computer type Data 620 model, manufactured by Data Machines, Inc. VHF control channel 131, and VHF receiving channel 132 are also responsive to reference frequencies derived from frequency synthesizer 135, actuated with highly stabilized oscillations from atomic clock, frequency standard 136.

Consideration is now given to the apparatus included within VHF control channel 131. VHF control channel 131 comprises command generator 137, responsive to signals derived from general purpose computer 134 and signals of reference frequency from synthesizer 135. Command generator 137 feeds modulation signals to interrogation transmitter 138, the output of which is coupled to VHF antenna 21 via diplexer 139, to modulate the transmitter output at frequencies of ±2400 Hz. to derive the frequency shift key (FSK) control signals that activate address decoder 46 in each balloon and then indicate the addresses of the balloons to be interrogated.

To these ends, command generator 137 includes two switches for selectively passing the ±2400 Hz. frequencies from synthesizer 135 to transmitter 138. Selection of the frequencies is in response to control signals applied to command generator 137 by general purpose, programmed computer 134. During an initial time interval at the beginning of each interrogation period, command generator 137 alternately feeds ±2400 Hz. modulation tones from synthesizer 135 to transmitter 138. Thereby, the modulation detector 45, FIGURE 3, on each of the balloon transponders is actuated.

After the initial period has elapsed, computer 134 feeds control signals to the remaining switches in generator 137 to selectively gate frequencies of ±2400 Hz. to transmitter 138. Selection of the +2400 or −2400 Hz. signal is based upon addresses of the particular balloon transponders being interrogated. The ±2400 Hz. signals modulate transmitter 138 in time sequence, with the Manchester code as described supra, to actuate the address decoders 46 in the transponders of the selected balloons 15–18. As indicated supra, after the address decoder 46 on the particular balloon 15–18 interrogated has been received, the transponder of that balloon commences transmission to central station 14 via the VHF link. After a 3-minute time period has elapsed, and transmission of a complete cycle of data between the selected balloon transponder and central station 14 has occurred, computer 134 supplies a second set of control signals to transmitter 138 via command generator 137, in the manner indicated.

Oscillators 118 and 122 on synchonous satellite 19 are subject to long term drift. To compensate for such drift at central station 14, satellite transponder monitor 141 is provided. Satellite transponder monitor 141 displays the frequency of the received signal from satellite 19 to enable an operator to adjust manually the center frequencies of interrogation transmitter 138 and VHF receiver 142 to compensate for oscillator drift in satellite 19. Receiver 142 is responsive to the VHF signal emitted by satellite 19, as transduced by antenna 21 and coupled through diplexer 139, to supply the received RF spectrum to satelilte transponder monitor 141.

In operation, a predetermined frequency, of 148 mHz, is emitted by transmitter 138 for a relatively long time duration. The predetermined frequency is received by satellite 19 and frequency translated to 137 mHz. that is transmitted by the satellite to each of balloons 15–18 and station 14. The transducers on balloons 15–18 do not respond to the long term, 137 mHz. signal because of AC coupling between modulation detector 45 and address decoder 46. The frequency is, however, visually displayed by satellite monitor 141. An operator viewing the display adjusts the carrier frequency of transmitter 138 and the center frequency of receiver 142 until the display reads the predetermined frequency and thereby compensates for drift of the satellite local oscillators.

VHF receiver channel 132, in addition to including receiver 142, diplexer 139 and antenna 21, includes four parallel data processing channels 151–154, responsive to the beat frequency IF derived from mixer 155. Mixer 155 heterodynes the output of local oscillator 156 with the spectrum from VHF receiver 142 to derive a replica of the signals transmitted from balloons 15–18 at a center frequency of 5 mHz.

Channels 151–154 separate the spectrum derived from mixer 155 into four different bands in response to four different reference frequencies applied to the channels by frequency synthesizer 135. The frequencies applied to channels 151–154 by synthesizer 135 for separation purposes are spaced from each other by 2.5 kHz, the separation of the VHF carrier frequencies of balloons 15–18, whereby each of the channels can simultaneously process signals from a different one of the balloons.

In response to the spectrum applied to channels 151–154 by mixer 155 and the separated reference frequencies applied to these channels by synthesizer 135, the platform channel selectors 157 of each channel derive a common IF difference frequency. The IF frequency derived by each channel selector is applied to a platform channel bandpass filter 158, the output of which is applied to balloon receiver 159. The several channel selectors 157 are arranged so that the IF signals passed by bandpass filters 158 of channels 151, 152, 153 and 154, correspond with the spectrums emitted by the transponders of balloons 15, 16, 17 and 18, respectively.

Balloon receivers 159 of channels 151–154 generate signals in response to replicas of the phase information transduced by balloons 15–18 respectively, as derived at the outputs of filters 158. Receivers 159 also generate binary bits corresponding with the meteorological data picked up by balloons 15–18. The positional and meterological data generated by channels 151–154 are applied to computer 134, which is programmed to compute the positions of the platforms, and provide human readable printout of the platform position, as well as the meteorological data.

Sequential control of all of channels 151–154 during each interrogation cycle is in response to the VLF Omega signals transmitted from the eight global Omega transmitters and computer 134. The VLF signals are received at central station 14 by antenna 161 which feeds Omega monitoring receiver 162. Omega receiver 162 includes means for responding to each of the three VLF's. VLF receiver 162 responds to the sequence of signals given by the table of FIGURE 2, to derive signals indicating which Omega frequencies are being emitted at any time instant. The frequency indicating signals derived from Omega monitoring receiver 162 are applied, as binary control inputs, to general purpose computer 134. Computer 134 responds to the signals from monitoring receiver 162 to supply Omega sync selector 163 with signals for selectively gating reference frequencies from synthesizer 135 to receivers 159 of channels 151–154. Computer 134 eliminates Omega receiver signals that cannot be effectively utilized for control purposes because of the great distance separating the transmitter sites from balloons 15–18 while they are not in line of sight with satellite 19.

Establishing which tone is indicative of which Omega transmitter is accomplished in a manual manner. In particular, at the time the central station VLF link is first established, receiver 162 is adjusted so that an aural tone is produced only in response to the 10.2 kHz. received signal. An operator listens to the received 10.2 kHz. aural tone, and when it is loudest he is informed that Omega transmitter 11, which is closer to central station 14 than any other Omega transmitter, is emitting a VLF signal. The operator actuates a control at the time when the loudest 10.2 kHz. signal is received, to initiate operation of the control circuitry within computer 134. Thereafter, computer 134 responds to the eight Omega stations to selectively activate sync selector 163 with control signals for gating reference frequencies to receivers 159.

Figure 7:
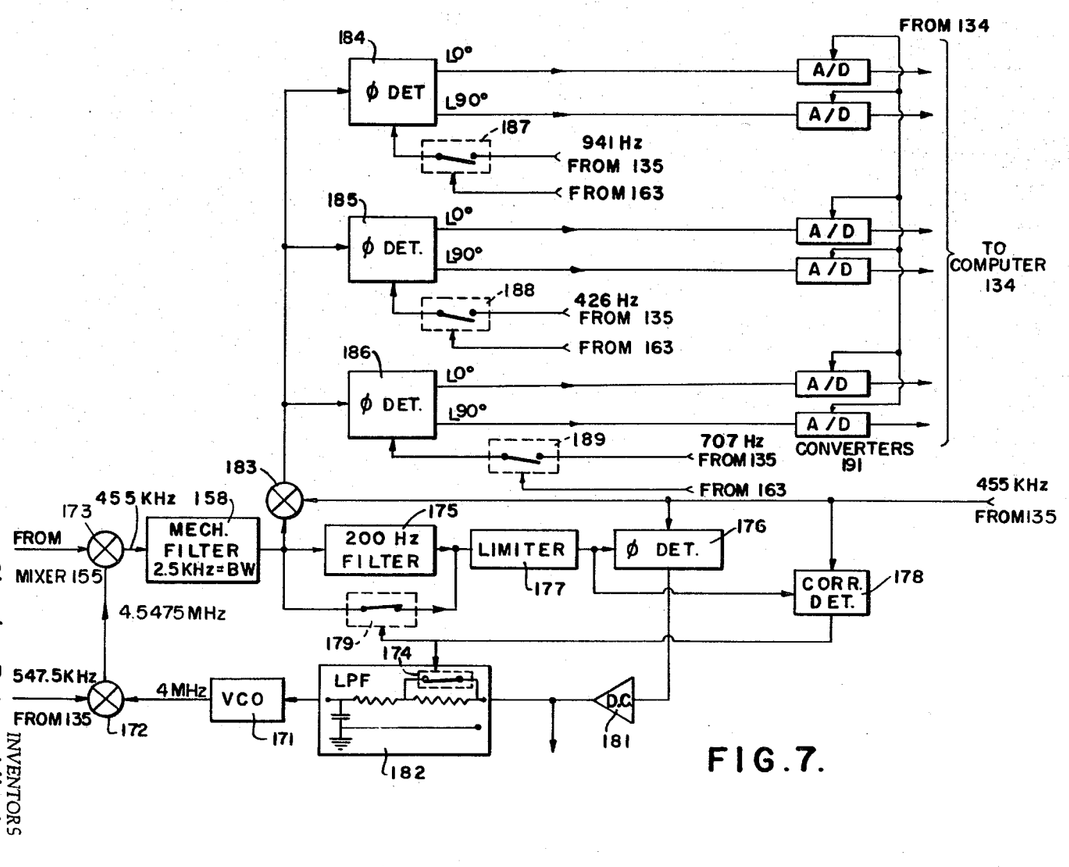
FIGURE 7 is a block diagram of a portion of the equipment included within the central station of FIGURE 6.

To provide a more complete description of the apparatus included within channels 151–154, reference is made to the block diagram of FIGURE 7, wherein the circuitry of channel 151 is illustrated in detail. It is understood that each of channels 152–154 includes substantially the same apparatus as is shown particularly in conjunction with FIGURE 7, but that the frequencies applied by synthesizer 135 to the platform selectors 157 thereof are displaced in frequency by 2.5 kHz. from each other and the frequency applied to channel 151.

Channel 151 basically comprises a phase locked loop established in response to the A/R tone from balloons 15–18. The phase locked loop causes a signal of reference frequency and phase within channel 151 to be generated, enabling the phase modulated single sideband signals indicative of meteorological and positional data to be extracted.

To establish the phase locked loop and extract the meteorological and positional data, the spectrum derived from mixer 155 is heterodyned into an IF that can be passed by bandpass filter 158. Heterodyning the spectrum into an IF that can be passed by filter 158 is accomplished by mixing the output of voltage controlled oscillator 171, having a center frequency of 4 mHz., with a reference frequency from synthesizer 135 in heterodyner 172. The signal supplied to heterodyner 172 has a frequency of $(454+2.5N)$ kHz., where N equals $+1$, $+2$, $-1$, and $-2$, for channels 151–154, respectively. Thereby, the frequency standard applied by synthesizer 135 to mixer 172 of channel 151 has a frequency of 547.5 kHz.

The 547.5 kHz. and 4 mHz. inputs to mixer 172 are heterodyned to derive a sum frequency of 4.5475 mHz. The 4.5475 mHz. output of mixer 172 is beat against the spectrum at the output of mixer 155 in heterodyner 173. Heterodyner 173 includes IF circuitry for deriving a 455 kHz. difference frequency, whereby only the 5.0025 mHz. portion of the spectrum derived from mixer 155 appears as a difference frequency output of mixer 173.

The 455 kHz. difference frequency spectrum derived from mixer 173 is limited to a bandpass of 2.5 kHz. by mechanical filter 158 having a bandwidth of 2.5 kHz. and a center frequency of 455 kHz. Thereby, the output voltage of filter 158 is a single side band tone that is a replica of the signal originally transmitted by the transponder of balloon 15. In a similar manner, single side band tones are derived from the filters 158 of channels 152–154 in response to signals from balloons 16–18, respectively.

The output frequency of filter 158 is applied through a variable bandwidth network, including bandpass filter 175 having a center frequency of 455 kHz. and bandpass of 200 Hz. and shunt switch 179, that drives phase detector 176 through amplitude limiter 177. Phase detector 176 is also responsive to a 455 kHz. reference frequency from synthesizer 135, to derive a D.C. voltage indicative of the phase difference of the output of limiter 177 relative to the reference phase applied to the detector.

A further D.C. voltage indicative of the phase relationship between the 455 kHz. reference frequency generated by synthesizer 135 and the output of limiter 177 is generated by correlation detector 178. Correlation detector 178 responds to the limiter output and the 455 kHz. reference to derive a positive D.C. voltage in response to the limiter and reference signals being in phase, i.e., at zero phase to each other; in contrast, phase detector 176 derives a zero D.C. voltage under such circumstances. In response to the reference and limiter phases being displaced by $+90°$, however, detectors 176 and 178 generate positive and zero voltages, respectively. The voltage generated by phase detector 176 is utilized for controlling oscillator 171 in the phase locked loop, while the output of correlation detector 178 controls the normally open contacts of switch 179 for selectively varying the phase locked loop bandwidth. The phase locked loop is completed by supplying voltage controlled oscillator 171 with the output of phase detector 176 via D.C. amplifier 181 and low pass filter 182, having a variable cut off frequency controlled by switch 174.

Detector 178 maintains the loop in a wide band, acquisition state until the loop frequency has been stabilized in response to the A/R tone. Once the loop has been stabilized, the loop bandwidth is reduced for tracking the phase of the received data indicating signals, without being affected by these signals. To these ends, correlation detector 178 controls the normally closed contacts of switches 174 and 179 to change the RF bandpass from 2.5 kHz. to 200 Hz. and vary the D.C. bandpass from 100 Hz. to 10 Hz. Switches 174 and 179 are energized from their closed states in response to the outputs of correlation detector 187 exceeding a predetermined level, indicative of the tracked A/R tone having been acquired. When the A/R tone being tracked, as coupled to detector 178, is out of phase with the 455 kHz. reference, detector 178 generates a low amplitude output signal that maintains the contacts of switches 174 and 179 closed. With switch 179 closed, the RF bandwidth is determined solely by filter 158 and equals 2.5 kHz. Closure of contacts 174 establishes a relatively low RC time constant for filter 182 to provide a cut-off frequency of 100 hertz. In response to the A/R tone, as coupled to detector 178, and the 455 kHz. reference being in phase for a predetermined time interval, on the order of 0.5 second, the correlation detector output voltage builds up to a level exceeding the threshold of switches 174 and 179, whereby the switches are energized to their open circuit conditions. Opening the contacts of switch 179 inserts filter 175 between filter 158 and limiter 177 to provide an RF tracking bandwidth of 200 Hz. Energizing contacts 174 to their open circuit condition inserts additional resistance in low pass filter 182, to reduce the filter cut-off frequency to 10 hertz. Narrowing the loop bandwidth once the A/R tone has been acquired prevents the loop from erroneously locking onto the subsequently received Omega signals, that are of larger amplitude and at displaced frequencies relative to the A/R reference tone, while providing phase reference for single side band Omega signals.

Meteorological indicating data are derived at the output of D.C. amplifier 181 during the interval from $t=11.83$ to $t=15.78$ seconds. The data derived from amplifier 181 are a series of positive and negative voltage levels commensurate with the voltage levels supplied to phase modulator 58 by signal conditioner 62, FIGURE 3. Because the meteorological data merely change the phase of the A/R tone by $\pm 60°$, depending upon the value of the binary signal, the same loop is utilized for extracting the meteorological data as is employed for establishing the reference frequency and phase in response to the A/R tone.

To extract the phase indicating Omega positional data, after the A/R tones and the meterological data have been derived, the quadrature phase relationships of the three Omega transmission frequencies must be determined. To this end, the IF output of filter 158 is beat to base band, i.e., a center frequency of zero (corresponding with the frequency of the A/R tone), by mixer 183, that is also responsive to the 455 kHz. reference from synthesizer 135. Thereby, mixer 183 derives a spectrum with components at 941 Hz., 426 Hz., and 707 Hz., respectively responsive to the Omega tones converted by the transponder of balloon 15 in response to Omega tones at 13.6 kHz., 10.2 kHz. and 11.33 kHz. In addition, the spectrum derived by mixer 183 includes a component at D.C., in response to the A/R tone transmitted from the transponder of balloon 15.

The spectrum derived from mixer 183 is applied in parallel to quadrature phase detectors 184–186, respectively supplied with reference phase signals at frequencies of 941 Hz., 426 Hz. and 707 Hz. Each of quadrature phase detectors 184–186 includes a pair of D.C. output signal levels, proportional to the zero and 90° phase separations of the frequency component applied thereto relative to the reference phase applied thereto. In consequence, detector 184 derives a pair of D.C. voltages commensurate with the position of balloon 15 relative to an Omega transmitter emitting the 13.6 kHz. tone, detector 185 derives a pair of D.C. voltages indicative of the position of balloon 15 from an Omega transmitter emitting a tone at 10.2 kHz. and detector 186 derives a pair of voltages indicative of the position of balloon 15 relative to an Omega transmitter emitting an 11.33 kHz. tone.

To prevent noise from masking the phase information from detectors 184–186 when a particular Omega transmitter at the corresponding frequency is so far from balloon 15 as to prevent accurate translation by the balloon transponder of the phase modulated, positional indicating data, switches 187–189 are connected between the reference signal input terminals of the detectors and the reference outputs of frequency synthesizer 135.

Switches 187–189 are selectively responsive to control signals from Omega sync selector 163, which is in turn responsive to control signals from computer 134, and Omega monitor receiver 162. Switches 187–189 are controlled by Omega sync selector 163 so that one, two, all, or possibly none, of quadrature detectors 184–186 is supplied with reference frequencies from synthesizer 135. Of course, only those detectors supplied with reference frequencies derive finite output voltages.

Each of the positional indicating output voltages derived by detectors 184–186 is sampled after each Omega transmission interval of approximately 1 second by one of the six analog-to-digital converters in array 191. Analog-to-digital converter array 191 responds to signals from computer 134 to supply input signals to the computer after each 1 second Omega transmission interval. Computer 134 includes interface circuitry and a memory, whereby the separate signals are stored at predetermined memory addresses.

Computer 134 is actuated so that signals derived from 18 of the ten-second cycles, depicted by the chart of FIGURE 2, are sequentially supplied to different addresses in the computer memory. In response to the data stored in the computer memory at the end of the 180-second interval, computer 134 determines the location and velocity (direction and magnitude) of balloon 15. The position of balloon 15 is ascertained by computing the average position thereof, as determined by the 18 different samples derived in response to the Omega information. Velocity of the balloon 15 is computed on a trial and error basis by assuming that the balloon has a plurality of predetermined velocity magnitudes and directions. Each assumed velocity magnitude and direction is segmented into 18 different parts, each represented as a time position vector. Each set of assumed time position vectors is multiplied with the actual time position vectors derived in response to the Omega signals relayed to central station 14 via balloon 15, to derive a plurality of resultant vector product sums. The set of assumed time position vectors that yields a resultant vector product sum most nearly approaching a straight line is considered as a relatively accurate indication of the balloon velocity.

To provide a more complete understanding of the invention and to summarize the system operation, a cycle of operation will be described, assuming that stations 11, 12 and 13 transmit Omega data as indicated by FIGURE 2, and that balloon 15 is being tracked. Of course, in actual system operation, several balloons are tracked simultaneously, as indicated supra. To simplify the exposition, however, it is assumed that only balloon 15 is tracked and interrogated.

The first step in obtaining information from balloon 15 is to enable each of the balloons 15–18 to respond to an interrogation, coded signal. Enabling each of balloons 15–18 is accomplished by modulating interrogation transmitter 138 of central station 14, FIGURE 6, with alternate ±2400 hertz FSK tones from frequency synthesizer 135 in response to control signals supplied to command generator 137 by computer 134. The ±2400 hertz modulation imposed on the 148 mHz. carrier of transmitter 138 is coupled to each of balloons 15–18 as a 137 mHz. carrier, with a frequency conversion being accomplished in synchronous satellite 19. The ±2400 hertz modulation imposed on the 137 mHz. signal is picked up by VHF antenna 34 of each of balloons 15–18. VHF antenna 34 of each balloon feeds the ±2400 hertz modulation to FM demodulator 44, the output of which activates modulation detector 45 in each of the balloons. In response to modulation detector 45 receiving the alternate ±2400 Hz. tones, address decoder 46 in each of balloons 15–18 is activated, so that it can respond to FSK binary, interrogation bits, coded in accordance with the selected balloon or balloons.

Central station 14 then emits a second series of ±2400 Hz. modulation tones on the 148 megahertz carrier of transmitter 138. The second series of ±2400 Hz. tones is indicative of the addresses of the selected balloons, in the present instance assumed to be only balloon 15. Selective modulation of the 148 megahertz carrier of transmitter 138 is accomplished in response to command signals supplied to the switches in generator 137 by signals from computer 134.

The computer supplies gating signals to switches in command generator 137 so that ±2400 Hz. signals from synthesizer 135 impose modulation on transmitter 138 in accordance with the address of the selected balloon. It is assumed that the address of balloon 15 is 000, an address achieved by sequentially supplying +2400, −2400, +2400, −2400, +2400 and −2400 Hz. bursts from synthesizer 135 as modulation for transmiter 138 so it derives modulation frequencies ±2400 Hz. The modulation bursts imposed on the output of transmitter 138 are decoded by each of the address decoders 46 of balloons 15–18, as three sequential binary zero signals.

Address decoder 46 of only balloon 15 recognizes an identity between its stored address of 000 and the address fed thereto via the VHF link. In response to the address decoder 46 of balloon 15 recognizing its stored address and upon completion of modulation of the signal transmitted from station 14, the system control network 47 of balloon 15 is activated. None of the other balloons 16–18 is assumed to be interrogated, whereby their shift registers and stored addresses do not coincide and the system control network 47 thereof is not activated. In consequence, only system control network 47 of balloon 15 is activated, to the exclusion of the system control networks on balloons 16–18 in response to the 000 coded modulation signal emitted from central station 14. Only balloon 15, therefore, transmits information regarding data picked up by its meteorological sensors and phase indicating Omega data during the cycle of operation being considered.

For the first half second after activation, system control network 47 supplies power to the transmitter and A/R networks on balloon 15. These operations are accomplished by energizing the power supplies of RF amplifier 51 and temperature compensated crystal oscillator 52. Simultaneously, a control signal is applied by system controller 47 to automatic attenuator 59 to effectively short-circuit the attenuator and provide a direct connection between phase modulator 58 and summing amplifier 53.

For the next 11.33 seconds, from $t=0.5$ to $t=11.83$ seconds after activation of system control network 47, the A/R tone derived from mixer 61 and translated by mixers 55–57 is transmitted as the carrier by VHF antenna 34 at full power of 5 watts. The A/R tone stabilizes the phase locked loop including phase detector 176, FIGURE 7, of central station 14. While it is expected that the phase locked loop including detector 176 will generally be stabilized considerably before the 11.33 second A/R tone has been completed, in certain instances this relatively long time duration may be required to stabilize the loop.

Initially, the phase locked loop has relatively wide RF and D.C. bandwidths of 2.5 kHz. and 200 Hz., respectively, as switches 179 and 174 are closed in response to a low correlation between the reference 455 kHz. supplied to the phase-locked loop and the received signal. As the frequency of oscillator 171 in the phase locked loop is driven into phase and frequency synchronism with the received A/R tone, as coupled to the loop via VHF receiver 142, the A/R tone and the 455 kHz. reference become better correlated. The higher degree of correlation is detected by correlation detector 178, and when exact phase and frequency synchronization between the received A/R tone and the reference frequency are achieved, the output of detector 178 achieves a maximum. The maximum output of detector 178 is sensed by switch 179, to insert filter 175 in the circuit and narrow the RF loop bandwidth from 2.9 kHz. to 200 hertz. Simultaneously, the D.C. loop bandwidth is reduced from an acquisition frequency of 100 Hz. to a tracking bandwidth of 10 Hz., by modifying the cut-off characteristics of low pass filter 182. After the loop has been switched from the wide band acquisition mode to the narrow band tracking mode, oscillator 171 remains relatively immune to any frequencies other than the A/R tone, hence functions as a stable reference frequency and phase source for single side band signals received thereafter from balloon 15.

After the 11.33 second A/R tone generation interval has been completed, system control network 47, FIGURE 3, supplies a power activating signal to signal conditioner 62. Upon activation, signal conditioner 62 responds to the meteorological sensors 63 connected to its input and supplies a series of binary zeros and ones to phase modulator 58. In response to the binary zeros and ones applied thereto by signal conditioner 62, phase modulator 58 varies the phase of the A/R tone by plus or minus 60°. This phase modulation is imposed on the A/R tone derived from mixer 61, to phase modulate the VHF carrier emitted by antenna 34.

The A/R signal from balloon 15 is received and heterodyned in receiver 142 and mixer 145 and coupled in parallel to each of channels 151–154. Only channel 151, however, responds to the signal from balloon 15 because the reference input to channel 151 from frequency synthesizer 138 provides an IF that can be passed by filter 158 of channel 151. The IF derived in each of the other channels is at a frequency displaced from the center frequency and band pass of filter 158 in these channels.

The plus and minus 60° phase variations imposed on the A/R tone are relayed back to central station 14 via the VHF link including satellite 19. Phase detector 176 in channel 151 responds to the plus and minus 60° phase variations imposed on the VHF signal emitted by balloon 15 to derive a sequence of positive and negative binary bits. The binary bits derived from phase detector 176 are fed to computer 134 via D.C. amplifier 181. Computer 134 is coded, on an a priori basis, to separate the bits and convert them into digital indications of the meteorological conditions picked up by sensors 63.

The data detected by meteorological sensors 63 are transmitted for a period of 3.94 seconds, from $t=11.83$ to $t=15.78$ seconds. When the time instant $t=15.78$ seconds is reached, system control network 47, on balloon 15, derives a control pulse for activating the balloon VLF channel 32, while reducing the power of the transmitted A/R tone. The first function is accomplished by supplying VLF amplifier 74 and limiter amplifiers 71–73 with power, while the second function is achieved by inserting a 10 db loss in attenuator 59, between phase modulator 58 and summing amplifier 53. Thereby, the power consumed by the A/R transmitted tone is reduced from a 5 watt to a 0.5 watt level, enabling full transmission of the VLF received tones.

The A/R tone is continuously emitted as a spectral component by VHF antenna 34, to maintain the phase locked loop of channel 151 at central station 14, in a stabilized condition. The phase locked loop does not track on the VLF modulation imposed on the VHF carrier emitted from antenna 34, at balloon 15, because the bandwidth of the receiver phase locked loop is too narrow (10 hertz) to pass the modulation components.

For the next 181 seconds, from $t=16.20$ seconds to $t=197.2$ seconds, the received VLF modulation from Omega stations 11–13 is imposed on the VHF carrier coupled from balloon 15 to central station 14 via satellite 19. This 181 second interval is separated into 18 different Omega receiving cycles, each of which is the same and is indicated by the chart of FIGURE 2. The manner in which the transponder on balloon 15 responds to the Omega signals, relays them to central station 14, and how the central station responds to Omega transmissions via the VLF and VHF links is now given.

It is assumed that at the time system control network 47 activates VLF channel 32 of balloon 15, station A, i.e., station 11, has commenced transmission at a frequency of 10.2 kHz. In response to station 11 transmitting at a frequency of 10.2 kHz., a control signal is supplied by receiver 162 to activate switches in Omega sync selector 163. In response to cessation of the prior Omega transmission, the program of computer 134 was activated to generate control signals for closing switch 188 and leaving switches 187 and 189 open. The control signals are continuously derived by the computer until the program is stepped at the end of the presently considered 0.9 second Omega transmission interval. The control signals are not, however, transmitted to switches 187–189 until the bank of three switches in Omega sync selector 163 is activated in response to reception of the presently considered 0.9 second Omega transmission interval. Thereby, response to the 0.9 second Omega signal being picked up by receiver 162, synthesizer 135 feeds a 426 Hz. reference to detector 185. Switches 187 and 189 feeding phase detectors 184 and 186 are not activated to the closed state by computer 134 because the Omega transmitters at stations G and H are so far from balloon 15 when the balloon is in line of sight communication with satellite 19 that the balloon cannot receive phase coherent, accurate VLF position information.

Omega sync selector 163 supplies phase detectors 185 of channels 152–154 with 426 Hz. reference waves from synthesizer 135 but these phase detectors derive zero output signals as mixers 183 which feed them with signals generate a zero output voltages during the cycle being considered.

Balloon 15 responds to the 10.2 kHz. emission from station 11 and converts it to a frequency of 115.905 kHz. in heterodyner 79. In converting the VLF signal to a 115.905 kHz. signal, heterodyner 79 preserves the phase relationship of the signal received by VLF antenna 75. The 10.2 kHz. tone is converted to a VHF signal, while preserving phase relationship, and is relayed via synchronous satellite 19 to central station 14. Central station 14 processes the signal, by feeding it to phase detector 185 of channel 151, the output of which is a pair of D.C. voltages having magnitudes proportional to the in-phase and quadrature phase components of the 10.2 kHz. signal received on balloon 15. Detector 185 measures the phase of the 10.2 kHz. signal received at balloon 15 by comparing the phase of the base band spectrum derived from mixer 182, wherein the 10.2 kHz. is translated to 426 Hz. with a 426 Hz. generated by synthesizer 135.

Just prior to each Omega transmission terminating, computer 134 derives a control signal for activating selected converters in analog-to-digital converter bank 191. Each of the analog-to-digital converters connected to a phase detector that was responsive to a reference frequency samples its corresponding detector D.C. voltage and converts the D.C. voltage into a binary wave train that is fed to the memory of computer 134. For example, during the interval just considered, only the converters responsive to detector 185 are connected to sample the detector output voltages and the remaining converters are inactive, whereby no memory addresses are provided for data from detectors 184 and 186 during the first operating period of the 10 second Omega sequence.

Upon completion of the 0.9 second transmission interval of the 10.2 kHz. tone by Omega transmitter 11, Omega monitoring receiver 162 supplies a pulse to Omega sync selector 163, to deactivate switch 188. Omega monitoring receiver 162 supplies a further signal to computer 134, whereby the computer is stepped to prepare for Omega transmission in the interval from 1.2 to 2.2 seconds.

The next Omega transmissions occur at a time of 1.2 seconds, and are from stations 11 and 12 at frequencies of 13.6 kHz. and 10.2 kHz. respectively. Omega monitoring receiver 162 at central station 14 responds to these transmissions, feeding a control signal to Omega sync selector 163. Omega sync selector 163 now responds to control signals, previously established in computer 134, to activate switches 187 and 188 for coupling 941 Hz. and 426 Hz. reference phase signals from synthesizer 135 to phase detectors 184 and 185, respectively. Switch 189 for the 707 Hz. input to detector 186 remains disabled, as the 11.33 kHz. Omega transmission is from station H, which is too remote from balloon 15 to provide meaningful, accurate phase indicating position data. The 941 Hz. and 426 Hz. reference frequencies of the 13.6 kHz. and 10.2 kHz. Omega emissions, the outputs of detectors 184 and 185, provide positional data indicative of the distance between balloon 15 and Omega stations 11 and 12.

Substantially simultaneously with activation of phase detectors 184 and 185 at central station 14, the 10.2 and 11.33 kHz. Omega signals from stations 12 and 11, respectively, are being picked up by VLF antenna 75 of balloon 15. The precise VLF signal times of arrival at balloon 15 are, of course, a function of the separation distance between the Omega transmitter sites and the balloon, and are utilized as the means for determining the balloon position. The 10.2 and 13.6 kHz. VLF signals are applied to separate channels 76 and 77 within the balloons, and are respectively converted to frequencies of 115.905 kHz. and 117.038 kHz. These signals are further converted in frequency, to the VHF band, and transmitted via synchronous satellite 19, to central station 14.

The central station responds to the VLF modulation components imposed on the VHF carrier transmitted to it and feeds them in parallel to phase detectors 184–186, with appropriate base band frequency conversion. Each of phase detectors 184 and 185 responds to the spectrum generated by mixer 182 to derive a pair of D.C. output voltages indicative of the in-phase and quadrature phase relationship of the Omega signal received by balloon 15 from transmitters 11 and 12 at frequencies of 13.6 and 11.3 kHz., respectively.

Upon completion of Omega emissions from transmitters 11 and 12, computer 134 is fed with a control signal by monitor receiver 162, to deactivate the switches in Omega sync selector 163 and advance the computer program to correspond with the Omega transmission occurring between 2.3 and 3.4 seconds, as indicated by the chart of FIGURE 2.

During the next Omega transmission interval, between 2.3 and 3.4 seconds, transmitters 11, 12 and 13 respectively derive VLF waves at 11.33 kHz., 13.6 kHz. and 10.2 kHz. Omega monitor receiver 162, at central station 14, responds to these emissions to gate control signals from computer 134 for closing each of switches 187–189, whereby each of detectors 184–186 is supplied with a different reference frequency and phase by synthesizer 135. Each of detectors 184–186 is supplied with a reference frequency by synthesizer 135 because computer 134 is programmed in such a manner that any one of the balloons within the line of sight of synchronous satellite 19, e.g., balloon 15, is capable of picking up accurate phase information from each of Omega transmitters 11–13.

Emissions from Omega transmitters 11–13 are propagated to VLF antenna 75 of ballon 15 and are separated into three separate channels 76–78, having center frequencies of 115.905 kHz., 117.038 kHz. and 115.390 kHz. The signals from stations 11, 12 and 13 are translated so that they propagate through channels 77, 78 and 76, respectively. Each of the received VLF signals is applied to summing amplifier 53 to modulate the VLF carrier emitted by antenna 34 with the same relative phase relationship as was received at VLF antenna 75. Thereby, three Omega spectrums are simultaneously emitted by VHF antenna 34 and coupled to central station 14 via synchronous satellite 19. The three VHF spectrums are translated to a base band frequency and detected in frequency detectors 184–186, the D.C. outputs of which are indicative of the position of ballon 15 from Omega transmitting stations 12, 13 and 11, respectively.

In the manner described, it should be evident as to how subsequent signals from Omega transmitters 11–13 are sequentially relayed via the transponder on balloon 15 to central station 14 and how the central station responds to these signals to derive D.C. signals indicative of the phase relationship thereof relative to a reference phase at the same frequency. The operation described continues for 18 complete 10-second Omega transmission intervals.

At the end of the 18 Omega transmission intervals, at $t=197.2$ seconds, system control network 47, on balloon 15, derives a control signal for removing power from each of the active elements on the balloon transponder, except for crystal oscillator 37 and RF amplifier 35. Thereby, balloon 15 is returned to its normal, inactive state, ready to respond once again to a 300 millisecond series of ±2400 Hz. conditional tones and an FSK interrogation signal. Of course, while balloon 15 was active, each of the other balloons remained in a relatively inactive state, with only crystal oscillator 37 and amplifier 35 energized. All of the other equipment on the remaining balloons was inactive, to minimize power consumption.

Upon completion of transmission of the 18 Omega cycles from balloon 15 to central station 14, the central station computer determines the position of the balloon. This is accomplished by first determining the relative phase difference between the signals received by balloon 15 from stations 11 and 12 at frequencies 10.2 kHz. This relative phase relationship is determined by interrogating the computer memory addresses where the in-phase and quadrature phase components of the 10.2 kHz. waves, as received on balloon 15, are stored. These relative phase relationships produce an isophase, hyperbolic shaped locus of points, such as indicated by line 22, FIGURE 1. Computer 134 then determines a second isophase line in response to the relative phase of the 10.2 kHz. data transduced by the transponder on balloon 15 from Omega stations 12 and 13. Where the two isophase lines intersect determines the position of balloon 15. Since these functions are performed in a well-known manner by computer 134, and the computer is merely programmed to solve them, there is no need for further description.

Computer 134 also responds to the 13.6 and 11.33 kHz. signals coupled through balloon 15 to central station 14 to assist in eliminating ambiguity due to half wave length repetition of radio wave propagation position. In the manner described supra, computer 134 responds to the 18 different Omega cycles to determine, statistically, the average position of balloon 15 and its relative velocity.

While we have described and illustrated one specific embodiment of our invention, it will be clear that variations of the details of construction which are specifically illustrated and described may be made without departing from the true spirit and scope of the invention as defined in the appended claims. For example, the transmission link via satellite 19 can be in the UHF spectrum rather than the VHF.

What is claimed is:

1. A method of telemetering the position of an object to a remote location comprising the steps of transmitting continuous wave VLF electromagnetic signals at a predetermined frequency from at least three predetermined spaced points, receiving said VLF signals on the object, modulating an RF carrier with a replica of the received VLF signals, on a real time basis, transmitting the modulated carrier, on a real time basis, to said remote location, receiving the modulated carrier at the remote location, and extracting phase information of the received VLF signals from the received modulated carrier at said remote location to derive indications of the position of the object.

2. The method of claim 1 further including the step of transmitting the modulated carrier as a single side band wave.

3. The method of claim 1 wherein the RF carrier is transmitted to said location via a synchronous satellite RF relay station.

4. The method of claim 1 further including the step of sensing data at said object, and modulating said carrier in response to the amplitude of the sensed data.

5. The method of claim 1 further including the steps of modulating said carrier with a reference frequency, stabilizing the frequency of an oscillator at said remote location in response to receipt of said reference frequency at said location, and extracting said phase information by heterodyning the received RF carrier having the received VLF signal modulated thereon with the frequency of the stabilized oscillator.

6. The method of claim 5 wherein said carrier is modulated by said reference frequency prior to modulating said carrier with said received VLF signals, and said oscillator is stabilized while said carrier is being modulated by said received VLF signals by continuing to modulate said carrier with said reference frequency while said VLF signals modulate said carrier.

7. The method of claim 6 further including the steps of transmitting the reference frequency modulated on the carrier at first and second power levels, said second power level being approximately an order of magnitude less than said first power level, said reference frequency modulating said carrier at said first and second power levels when said VLF signals respectively do not modulate and do modulate said carrier.

8. A method of telemetering the position of an object to a remote location comprising the steps of transmitting continuous wave VLF electromagnetic signals at a plurality of displaced frequencies from each of at least three predetermined spaced points, receiving said VLF signals on the object, modulating an RF carrier with a replica of the received VLF signals, on a real time basis, transmitting the modulated carrier, on a real time basis, to said remote location, receiving the modulated carrier at the remote location, and extracting phase information of the received VLF signals from the received modulated carrier at said remote location to derive indications of the position of the object.

9. The method of claim 8 further including the step of reducing the separation of said displaced frequencies relative to their separation as received on the object when modulating said carrier, whereby each of the VLF signals modulating said carrier is transmitted between the object and remote location without relative phase perturbation.

10. The method of claim 8 wherein the RF carrier is transmitted to said location via a synchronous satellite RF relay station.

11. A method of telemetering data from at least two objects to a remote location comprising the steps of transmitting a first coded identification signal from said location to said objects, said first identification signal being unique to only one of said objects, receiving simultaneously said identification signal on said objects, transmitting data only from said one object to said remote location in response to receipt of said identification signal by said one object, wherein data being transmitted from said first object is at a first predetermined carrier frequency, receiving said first carrier frequency at said remote location, filtering said first carrier frequency at said remote location, feeding the filtered first carrier frequency to a first channel, transmitting a second coded identification signal from said location to said objects, said second identification signal being unique to only a second one of said objects, receiving simultaneously said second identification signal on said objects, transmitting data only from said second object to said remote location in response to receipt of said second identification signal at said second object, wherein data transmitted from said second object is at a second predetermined carrier frequency, receiving said second carrier frequency at said remote location, filtering said second carrier frequency at said remote location, feeding the filtered second carrier frequency to a second channel, and deriving indications of the data transmitted from said first and second objects in response to signals derived from said first and second channels, respectively, said first and second channels being exclusively responsive to said first and second carrier frequencies, respectively.

12. The method of claim 11 further including the steps of transmitting an alert signal from said location to each of said objects prior to transmission of said identification signals, and activating identification signal recognizing means on each of said objetcs in response to receipt of said alert signal at each of said objects.

13. The method of claim 11 wherein said signals and carrier frequencies are transmitted between said objects and said location via a synchronous satellite, transmission between said objects, said location and said satellite being in the VHF spectrum.

14. The method of claim 11 further including the steps of transmitting continuous wave VLF electromagnetic signals at a predetermined frequency from at least three predetermined spaced points, receiving said VLF signals on each of said objects, modulating each of said carriers with a replica of the received VLF signals, on a real time basis, transmitting the modulated carriers, on a real time basis, to said remote location, receiving the modulated carriers at the remote location, and extracting phase information of the received VLF signals from the received modulated carriers at said remote location to derive indications of the positions of the objects.

15. The method of claim 14 further including the step of transmitting the modulated carriers as single side band waves.

16. The method of claim 14 wherein said signals and carrier frequencies are transmitted between said objects and said location via a synchronous satellite, transmission between said objects, said location and said satellite being in the VHF spectrum.

17. The method of claim 14 further including the steps of modulating said carriers with a reference frequency, stabilizing the frequency of an oscillator at said remote location in response to receipt of said reference frequency at said location, maintaining the frequency of said oscillator stabilized while said carriers are being modulated by said received VLF signals, and extracting said phase information by heterodyning the received carriers having the received VLF signals modulated thereon with the frequency of the stabilized oscillator.

18. The method of claim 11 further including the steps of transmitting continuous wave VLF electromagnetic signals at a plurality of displaced frequencies from each of at least three predetermined spaced points, receiving said VLF signals on each of said objects, modulating each of said carriers with a replica of the received VLF signals, on a real time basis, transmitting the modulated carriers, on a real time basis, to said remote location, receiving the modulated carriers at the remote location, and extracting phase information of the received VLF signals from the received modulated carriers at said remote location to derive indications of the positions of the objects.

19. The method of claim 18 further including the step of reducing the separation of said displaced frequencies relative to their separation as received on the objetcs when modulating said carrier, whereby each of the VLF signals modulating said carrier is transmitted between each of the objects and the remote location without relative phase perturbation.

20. The method of claim 17 wherein said carriers are modulated by said reference frequency prior to modulating said carriers with said received VLF signals, and said oscillator is stabilized while said carriers are being modulated by said received VLF signals by continuing to modulate said carriers with said reference frequency while said VLF signals modulate said carriers.

21. A transponding station for selectively relaying VLF signals transmitted from a plurality of displaced stations to a remote location in response to command signals from the location comprising: means for receiving the command signals from the location, means for receiving the VLF signals from the displaced stations, means for modulating an RF carrier, on a real time basis, with a reference frequency, means for modulating said carrier, on a real time basis, with the received VLF signals without differentially modifying the phase of the carrier by the different VLF signals, means responsive to said first-named receiving means for initially transmitting, on a real time basis, the carrier only with said reference frequency modulated thereon to the remote location in response to said command signal and for subsequently transmitting, on a real time basis, the carrier with said reference frequency and VLF signals modulated thereon, and means for reducing the power of the reference frequency modulated on the carrier during the subsequent transmission relative to the initial transmission.

22. The station of claim 21 wherein each of said stations transmits a plurality of VLF signals at displaced frequencies, and said station includes means for reducing the frequency separation of said VLF signals, said means for modulating being responsive to the VLF signals with reduced frequency separation, said VLF signals being reduced to a spectrum having a bandwidth sufficiently narrow to maintain the propagation times of the VLF modulation on the carrier substantially the same for each VLF frequency during transmission from the station to the remote location.

23. The station of claim 22 wherein said means for reducing includes means for converting the frequencies of the received VLF signals to a plurality of higher frequencies, a filter for each of said higher frequencies, each of said filters passing only one of said higher frequencies to the exclusion of the others.

24. The station of claim 23 wherein said station includes means for deriving sensory signals in response to conditions thereat, and means for modulating the carrier in response to said sensory signals, said latter-named means further including means for phase modulating the reference frequency in response to the amplitude of the sensory signal, said reference frequency being derived with constant predetermined phase prior to being phase modulated, said reference frequency being phase modulated at a time different from when the VLF signals modulate the carrier.

25. The method of claim 11 wherein said first and second carrier frequencies are simultaneously transmitted.

26. The method of claim 25 wherein said identification signals are transmitted to said objects in sequence.

27. The method of claim 26 further including the steps of transmitting an alert signal from said location to each of said objects prior to transmission of said identification signals, and activating identification signal recognizing means on each of said objects in response to receipt of said alert signal at each of said objects, a plurality of different ones of said identification signals being transmitted for only one of said alerting signals.

References Cited

UNITED STATES PATENTS

| 2,606,317 | 8/1952 | Wallace | 343—6 |
| 3,054,100 | 9/1962 | Jones | 343—6.5 |
| 3,325,809 | 6/1967 | Meranda et al. | 343—103 |
| 3,369,236 | 2/1968 | Westerfield et al. | 343—100 |
| 3,378,845 | 4/1968 | Welber | 343—100 |
| 3,400,399 | 9/1968 | Kline | 343—105 X |

RODNEY D. BENNETT, Jr., Primary Examiner

R. E. BERGER, Assistant Examiner

U.S. Cl. X.R.

343—6.5, 100, 105